June 2, 1970  KATUMASA KITAHARA  3,515,392
ADAPTER FOR EP RECORDS OF AN AUTOMATIC CHANGER
Filed May 28, 1968  4 Sheets-Sheet 1
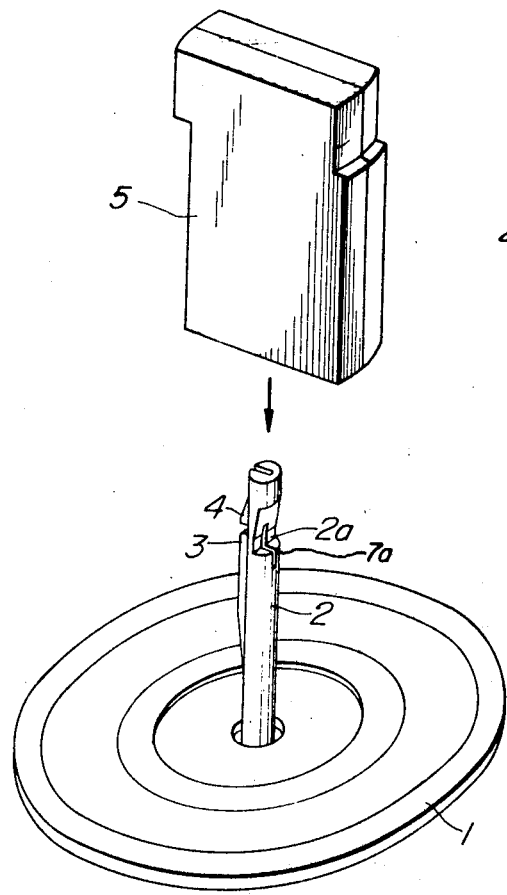
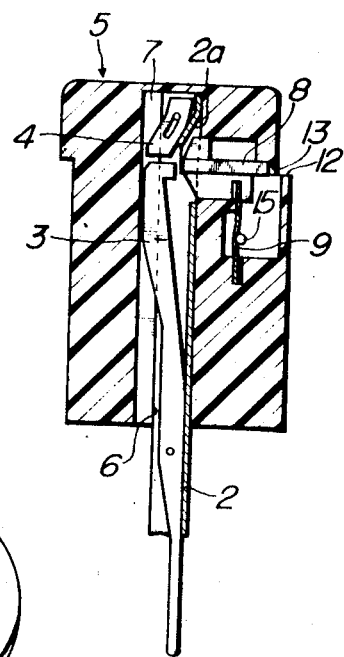
INVENTOR
Katumasa Kitahara
BY Stevens, Davis, Miller & Mosher
ATTORNEYS June 2, 1970 KATUMASA KITAHARA 3,515,392
ADAPTER FOR EP RECORDS OF AN AUTOMATIC CHANGER
Filed May 28, 1968 4 Sheets-Sheet 2

INVENTOR
Katumasa Kitahara
BY Stevens, Davis, Miller & Mosher
ATTORNEYS

June 2, 1970   KATUMASA KITAHARA   3,515,392
ADAPTER FOR EP RECORDS OF AN AUTOMATIC CHANGER
Filed May 28, 1968   4 Sheets-Sheet 3

INVENTOR
Katumasa Kitahara
BY Stevens, Davis, Miller & Mosher
ATTORNEYS

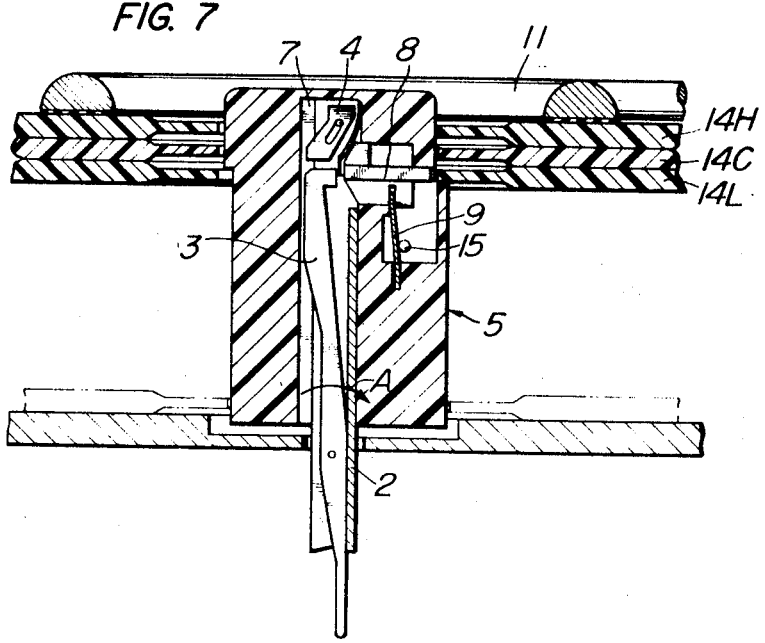
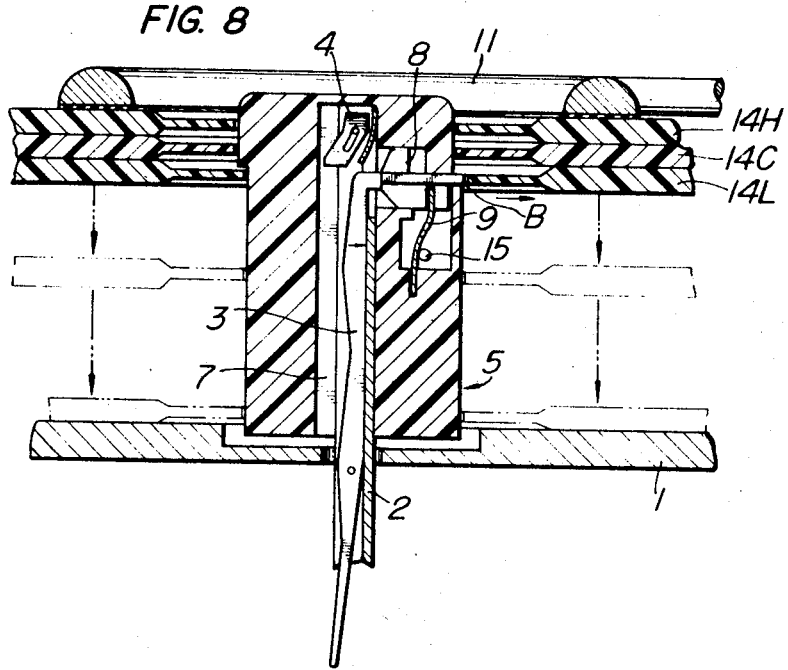

United States Patent Office 3,515,392
Patented June 2, 1970

3,515,392
ADAPTER FOR EP RECORDS OF AN AUTOMATIC CHANGER
Katumasa Kitahara, Nara-ken, Japan, assignor to Matsushita Electric Industrial Co., Ltd., Kadoma-shi, Osaka, Japan, a corporation of Japan
Filed May 28, 1968, Ser. No. 732,605
Claims priority, application Japan, June 2, 1967, 42/47,403
Int. Cl. G11b 17/04
U.S. Cl. 274—10                4 Claims

ABSTRACT OF THE DISCLOSURE

Here is disclosed an adapter for EP or 45 r.p.m. records to be applied to a spindle of an automatic changer for LP records comprising a body shaped like a piece of a flat plate having an offset portion defining a shoulder for EP or 45 r.p.m. records, said body being provided with a central bore by which the adapter is mounted onto said spindle and including an actuator member which is movable in a transverse direction so that it drives an EP or 45 r.p.m. record out of said shoulder when a trigger arm for driving LP records of said spindle is actuated and is retreated to its inoperative position by a resilient means when the trigger arm is not actuated.

---

The present invention relates to an adapter for EP or 45 r.p.m. records to be applied to a spindle of an automatic changer for LP records.

Adapters for EP or 45 r.p.m. records for use with an automatic changer for LP records are known. However, most of the conventional adapters are of a cylindrical type having ratchet means and complicated mechanism including a lot of parts, which unavoidably makes the process of manufacturing the same complicated and raises the cost of the products.

Accordingly, the object of the present invention is to provide an adapter for EP or 45 r.p.m. records to be applied to a spindle of an automatic changer for LP records, which has a simple construction and is easily applicable but operates positively and is favorable in the view point of the cost.

The above-mentioned object is attained, according to the present invention, by an adapter for EP or 45 r.p.m. records to be applied to a spindle of an automatic changer for LP records, said spindle having a transversely reduced portion defining a shoulder for LP recorrs and a trigger arm for driving a LP record out of said shoulder, comprising a body having an offset portion presenting a shoulder for EP or 45 r.p.m. records and a bore provided substantially along its axis for receiving said spindle, characterized by an actuating member mounted in said body in such a manner as to be pushed in a transverse direction by said trigger arm to drive an EP or 45 r.p.m. record out of said shoulder for EP records.

The actuating member may preferably have an end portion shaped to complementally conform to said transversely reduced portion of said spindle so that the end portion presents two oppositely inclined surfaces toward said spindle in a manner to facilitate the engagement and disengagement between said spindle and said actuating member.

In order to determine the angularly relative position between said spindle and the adapter, said bore of the adapter may be provided with a groove to receive a portion of said trigger arm.

The actuating member which is pushed out by the trigger arm in operation is preferably retreated toward said trigger arm by a resilient means in normal condition.

For the convenience of dealing with and keeping the adapter, the body of the same may have a generally thin cross section defined by two substantially parallel wider planes and two oppositely arranged narrower arcuate surfaces corresponding to the central opening of an EP or 45 r.p.m. record.

FIG. 1 shows in a perspective view of a spindle of an automatic changer for LP records and an adapter for EP or 45 r.p.m. records to be applied to said spindle, as an embodiment of the present invention;

FIG. 2 is a longitudinal section of the adapter shown in a condition where the adapter is completely mounted to said spindle;

FIGS. 7 and 8 are longitudinal sections of the adapter, showing the manner of operation of the same.

Figure 3:
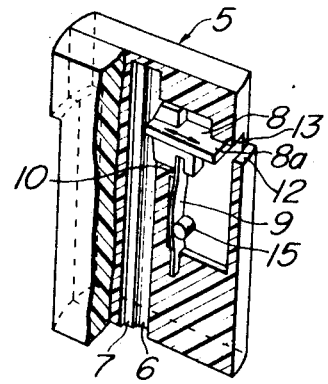
FIG. 3 is a perspective view of the adapter with a portion of it being cut off for the purpose of illustration.

A preferred embodiment of the present invention will now be explained with reference to the accompanying drawings.

Referring to FIG. 1, there is shown a spindle of an automatic changer for LP records which itself is known and has a center spindle 2 vertically arranged at the center of a turntable 1. The center spindle is provided with a transversely reduced portion 2a defining a shoulder for LP records, a trigger arm adapted to successively drive the LP records supported on the shoulder out of the same for playing, and a record keeper 4 for so keeping the LP records in charge that they are certainly engaged on the shoulder.

The present invention provides an adapter 5 for EP or 45 r.p.m. records, which is applied to the above-mentioned spindle of the automatic changer for LP records. The body of the adapter 5 may be made of a synthetic resin to have a shape of a flat plate provided with a central bore 6 extending substantially along its axis. The body is slightly offset transversely at a portion somewhat below the upper end thereof to present a shoulder 12 for EP or 45 r.p.m. records, and the offset surfaces are so arcuately curved as to conform to the central opening of the EP or 45 r.p.m. record. The central bore 6 receives the central spindle 2 and is provided with a groove 7 along the wall of the bore. The groove 7 receives the trigger arm 3 and the record keeper 4, whereby the relative angular position between the spindle 2 and the adapter 5 is positively determined.

Within the body of the adapter and at a position near said offset portion, there is slidably mounted an actuating member 8 having an end which is abutted against an actuating end of the trigger arm 3. The actuating member is resiliently urged toward the trigger arm by a leaf spring 9, which is mounted within said body and is restricted by a projection 10 in the transverse direction.

The other end of the actuating member 8 is formed as a flat tongue 8a, which is so positioned as to be projected out of an arcuately curved side wall through an opening 13 just over the shoulder 12. The tongue, when it is driven out of the side wall, drives the lowermost record supported on the shoulder 12 out of the same, whereby the record falls onto the turntable 1 for playing.

Figure 4:
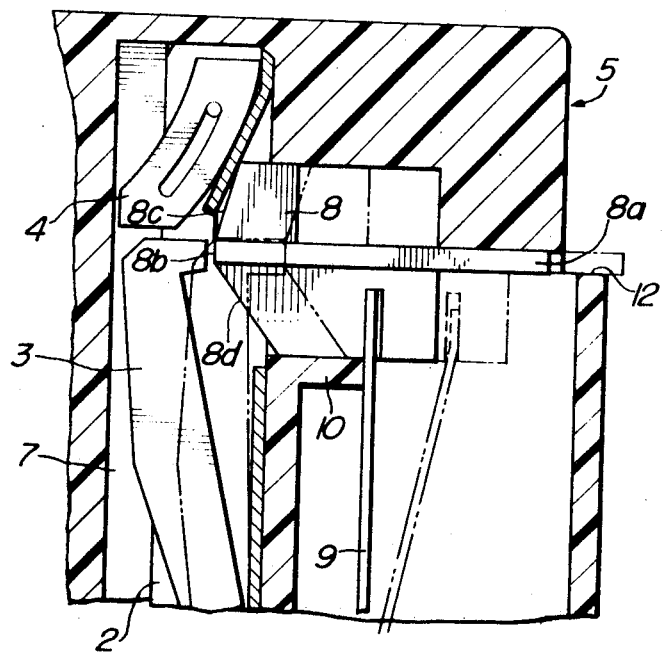
FIG. 4 is an enlarged longitudinal section of a portion of the adapter.

Furthermore, the one end of the actuating member 8, which is abutting against the actuating end of the trigger arm 3, is provided with a central vertical portion 8b and two oppositely inclined portions 8c and 8d following on both sides of the vertical portion (FIG. 4). These two inclined portions perform an important roll at the time of mounting and dismounting of the adapter, as it will be described hereinafter.

At a central portion of the leaf spring 9, it is supported by a pin 15 mounted in the adapter body, whereby the elastic function of the leaf spring is strengthened.

Figure 5:
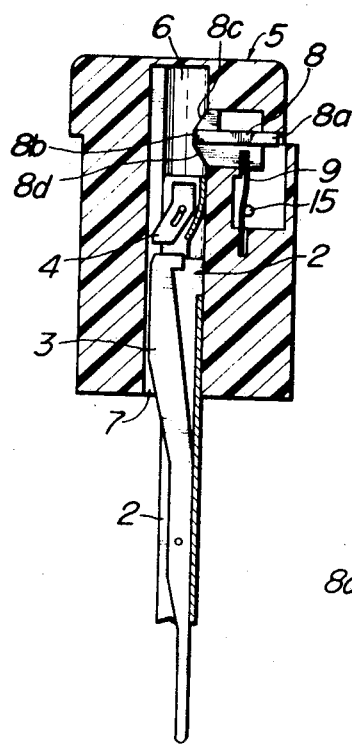
FIGS. 5 and 6 are longitudinal sections of the adapter, showing the manner of engagement between the adapter and the spindle.
Figure 6:
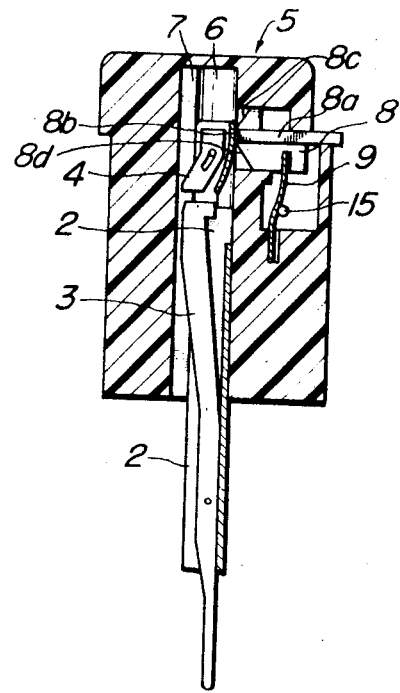

The adapter of the present invention operates as follows:

To begin with, the adapter 5 is mounted onto the center spindle 2 by utilizing the fittings between the bore 6 and the spindle 2 and between the groove 7 and the trigger arm 3 and the record keeper 4. The completely mounted condition is shown in FIGS. 2 and 4. while some conditions on the way of mounting are shown in FIGS. 5 and 6. When the spindle 2 is inserted into the bore 6 with the record keeper 4 and the trigger arm 3 being received in the groove 7, the fitting will smoothly progress until the upper end of the spindle 2 meets with the inclined portion 8d. The actuating member 8 is resiliently urged toward the spindle 2 by the leaf spring 9, but if the adapter 5 is pushed down by a force strong enough to overcome the force of the spring, the upper end of the spindle can easily glide on the inclined portion 8d to urge the actuating member 8 against the force of the spring as shown in FIG. 6. At the completely mounted condition, the end portion of the actuating member defined by the portions 8b, 8c are received in the reduced portion 2a of the spindle while the portion 8d is received in portion 7a of groove 7 which receives the trigger arm 3 and the record keeper 4 and opens at said reduced portion and at the supporting shoulder, and therefore, the actuating member is returned to its normal position by being resiliently urged toward the spindle, with the vertical portion 8b again abutting against the actuating end of the trigger arm 3. When the adapter 5 is dismounted, the inclined portion 8c engages with an upper inclined portion of the reduced portion 2a, whereby the actuating member 8 is again urged against the spring 9 and the spindle 2 is disengaged easily out of the bore 6.

The completely mounted adapter 5 is charged with EP records as shown in FIG. 7. In the condition of FIG. 7, if the internal mechanism of the record player (not shown) is actuated to turn the trigger arm 3 in the direction shown by an arrow A, the actuating member 8 of the adapter is so driven by the trigger arm as to drive with its tongue 8a the lowermost record 14L which is supported on the shoulder 12 out of the same in the direction shown by an arrow B, as shown in FIG. 8, whereby the record 14L apparently falls on the turntable 1. After the completion of the above-mentioned operation of dropping a record, the internal mechanism returns the trigger arm in the reversed direction, and accordingly, the actuating member 8 is also returned to its normal retreated position by the resilient force of the leaf spring 9. This normal condition is kept unchanged during the playing of the record 14L, until with the end of the playing of the record 14L the internal mechanism is again actuated and the same operation is repeated for the next record 14C.

The reference numeral 11 in FIGS. 7 and 8 designate a record holder.

From the foregoing, it will be appreciated that the adapter of the present invention has a very simple construction composed of a small number of parts but is operable in a sufficiently positive manner. Because of the simple construction, the cost of the adapter of the present invention can be made substantially lower than that of the conventional ones. It is also a great advantage of the adapter of the present invention that it has a thin and compact configuration, which facilitates the keeping and carrying of the same.

I claim:

1. An adapter for use with a spindle of an automatic changer for LP records having a transversely reduced portion presenting a substantially horizontal surface for supporting LP records charged thereon, a vertical wall surface of a height of at least a thickness of a common LP record and an inclined wall surface extending upward from the upper end of said vertical wall surface, a record keeper presenting a surface for guiding the central opening of a LP record along said inclined wall surface and a trigger arm for driving an LP record off said shoulder, said record keeper and trigger arm being partially received in a groove extending along a longitudinal axis of said spindle, said groove being opened to said reduced portion at least at said shoulder and vertical wall surfaces, said adapter being for EP or 45 r.p.m. records and comprising a body having an offset portion presenting a shoulder for EP records and a bore provided substantially along its axis for receiving said spindle, characterized by an actuating member having an outer end for engaging an EP record on said shoulder and mounted in said body in such a manner as to be movable in a direction transverse to said spindle and driven by said trigger arm to drive an EP record off said shoulder, said member having an inner end, said inner end having a first portion adapted to normally abut against said vertical wall surface and engage with said trigger arm when said member is driven, second and third portions extending downward and upward from said first portion in a manner to present inclined surfaces for enabling smooth mounting and removal of said adapter from said spindle, respectively, said second portion being received in a portion of said groove opening to said surface when said adapter is being applied onto said spindle.

2. An adapter according to claim 1, wherein said bore is provided with a groove for receiving such portions of said record keeper and trigger arm that protrude from said spindle.

3. An adapter according to claim 1, wherein said actuating member is constantly biased by a resilient means toward said bore so that said member is normally kept at a retreated position in which said inner end of said member is engaged in said reduced portion of said spindle when said adapter is on said spindle.

4. An adapter according to claim 1, wherein said body has a generally thick cross section defined by two substantially parallel wider planes and two oppositely arranged narrower actuate surfaces corresponding to the central opening of an EP record.

References Cited

UNITED STATES PATENTS

| | | | |
|---|---|---|---|
| 3,355,176 | 11/1967 | Tatter et al. | 274—10 |
| 3,301,563 | 1/1967 | Simpson | 274—10 |
| 3,329,435 | 7/1967 | Koepke | 274—10 |

LEONARD FORMAN, Primary Examiner

S. L. STEPHAN, Assistant Examiner